(12) United States Patent
Ku

(10) Patent No.: US 10,634,543 B2
(45) Date of Patent: Apr. 28, 2020

(54) ULTRASONIC CONCENTRATION DETECTOR AND LIQUID FEATURE DETECTOR

(71) Applicant: Dongguan Zhengyang Electronic Mechanical Co. Ltd., Dongguan (CN)

(72) Inventor: Yi-Hsin Ku, Dongguan (CN)

(73) Assignee: DONGGUAN ZHENGYANG ELECTRONIC MECHANICAL CO., LTD., Guangdong Province (CN)

( * ) Notice: Subject to any disclaimer, the term of this patent is extended or adjusted under 35 U.S.C. 154(b) by 147 days.

(21) Appl. No.: 16/071,060

(22) PCT Filed: Dec. 21, 2017

(86) PCT No.: PCT/CN2017/117732
§ 371 (c)(1),
(2) Date: Jul. 18, 2018

(87) PCT Pub. No.: WO2018/121403
PCT Pub. Date: Jul. 5, 2018

(65) Prior Publication Data
US 2019/0025111 A1    Jan. 24, 2019

(30) Foreign Application Priority Data
Dec. 27, 2016   (CN) .......................... 2016 1 1226784

(51) Int. Cl.
*G01F 23/296*     (2006.01)
*G01N 29/02*      (2006.01)
(Continued)

(52) U.S. Cl.
CPC .......... *G01F 23/296* (2013.01); *G01N 29/02* (2013.01); *G01N 29/024* (2013.01); *G01N 29/32* (2013.01);
(Continued)

(58) Field of Classification Search
CPC .... G01N 29/02; G01N 29/024; G01N 29/028; G01N 29/032; G01N 29/036;
(Continued)

(56) References Cited

U.S. PATENT DOCUMENTS 6,308,572 B1 * 10/2001 Ishikawa .............. G01N 29/024
                                                              73/24.01
2004/0025576 A1 * 2/2004 Glauser .................. B82Y 30/00
                                                              73/61.79
(Continued)

FOREIGN PATENT DOCUMENTS

CN            1062416 A       7/1992
CN         202049135 U      11/2011
(Continued)

OTHER PUBLICATIONS

International Search Report cited in PCT/CN2017/117732, dated Mar. 20, 2018, 6 pages.

*Primary Examiner* — Nathaniel J Kolb
(74) *Attorney, Agent, or Firm* — Workman Nydegger

(57) ABSTRACT

An ultrasonic concentration detector and liquid feature detector, the detector includes a body, a concentration detection tube, and an ultrasonic transducer sheet; the body includes a sealed chamber and an end cap part; an opening at a first end of the concentration detection tube is encapsulated by a reflection plate, and an opening at a second end of the concentration detection tube is encapsulated by the end cap part; the reflection plate faces to an outer surface of the end cap part; and a upper side and a lower side of the concentration detection tube are provided with an upper through hole and a lower through hole respectively. The ultrasonic transducer sheet is disposed in the sealed chamber at a second end of the concentration detection tube, facing to a reflection plate.

16 Claims, 3 Drawing Sheets

(51) Int. Cl.
*G01N 29/32* (2006.01)
*G01N 29/024* (2006.01)

(52) U.S. Cl.
CPC .. *G01N 2291/011* (2013.01); *G01N 2291/022* (2013.01); *G01N 2291/0228* (2013.01); *G01N 2291/02809* (2013.01); *G01N 2291/045* (2013.01); *G01N 2291/101* (2013.01)

(58) Field of Classification Search
CPC ............ G01N 29/32; G01N 2291/011; G01N 2291/022; G01N 2291/02809; G01N 2291/0228; G01N 2291/045; G01N 2291/101; G01F 23/296
See application file for complete search history.

(56) References Cited

U.S. PATENT DOCUMENTS

2014/0366611 A1      12/2014  Kukita et al.
2015/0089996 A1*     4/2015   Reimer .................. G01N 29/02
                                                     73/19.03
2019/0056357 A1*     2/2019   Reimer ................ G01N 29/024

FOREIGN PATENT DOCUMENTS

| CN | 103278561 A | 9/2013 |
| CN | 106596717 A | 4/2017 |
| CN | 206378458 U | 8/2017 |
| CN | 205538833 U | 8/2018 |
| JP | 2012247291 A | 12/2012 |

* cited by examiner

ULTRASONIC CONCENTRATION DETECTOR AND LIQUID FEATURE DETECTOR

TECHNICAL FIELD

The present disclosure relates to the field of sensors, and for example, relates to an ultrasonic concentration detector and a liquid feature detector.

BACKGROUND TECHNIQUE

Ultrasound is a sound wave with a frequency higher than 20000 Hz. It has good directionality and strong penetrating ability, is easy to obtain relatively concentrated sound energy, has a long distance of propagation in water, and can be used for distance measurement, speed measurement, cleaning, welding, stone crushing, and sterilization. There are many applications of ultrasound in medicine, military, industry and agriculture. Ultrasound is non-polluting and noiseless, and will not cause any harmful effect on the environment. The transmission speed of sound is different in liquids with different concentrations. Therefore, ultrasound can be used to achieve on-line detection of liquid concentrations.

In the related art, ultrasound has been widely used in the detection of the concentration of various liquids. However, the ultrasound concentration detection in the related art is susceptible to interference from the outside, for instance, factors such as the interference of air bubbles and other impurities, the variation of the flow velocity, and the like all affect the accuracy of the measurement results.

SUMMARY

The present disclosure provides an ultrasonic concentration detector and a liquid feature detector, which can effectively solve the problem that the ultrasonic concentration detection is susceptible to external interference.

An ultrasonic concentration detector includes a body, a concentration detection tube, and an ultrasonic transducer sheet; the body comprises a sealed chamber; the concentration detection tube is horizontally disposed, an opening at a first end of the concentration detection tube is encapsulated by a reflection plate, an opening at a second end of the concentration detection tube is encapsulated by the body, a upper side of the concentration detection tube is provided with an upper through hole, a lower side of the concentration detection tube is provided with a lower through hole, and the upper through hole and the lower through hole are communicated with an interior of the concentration detection tube; in a plane perpendicular to an extending direction of the concentration detection tube, an angle of the upper through hole is an angle between a line connecting a first side of the upper through hole with a center of a cross section of the concentration detection tube and a line connecting a second side of the upper through hole with the center of the cross section of the concentration detection tube; in the plane perpendicular to the extending direction of the concentration detection tube, an angle of the lower through hole is an angle between a line connecting a first side of the lower through hole with the center of the cross section of the concentration detection tube and a line connecting a second side of the lower through hole with the center of the cross section of the concentration detection tube; the angle of the upper through hole is larger than the angle of the lower through hole, wherein the first side of the upper through hole, the second side of the upper through hole, the first side of the lower through hole and the second side of the lower through hole are parallel to the extending direction of the concentration detection tube, and the upper through hole and the lower through hole face to each other; and the ultrasonic transducer sheet is disposed in the sealed chamber at the second end of the concentration detection tube, facing to a reflection plate.

Optionally, the ultrasonic concentration detector further includes a temperature sensor disposed in the sealed chamber.

Optionally, the body further includes an end cap part, the end cap part is configured to encapsulate the opening at the second end of the concentration detection tube; the reflection plate faces to an outer surface of the end cap part; and the ultrasonic transducer sheet is attached on an inner surface of the end cap part.

Optionally, the temperature sensor is attached on an inner wall of the body, the body further includes an outlet for wires, and the outlet for wires is communicated with the sealed chamber.

Optionally, the angle of the upper through hole is in a range of 60°-120°, and the angle of the lower through hole is in a range of 15°-40°.

Optionally, the concentration detection tube is a circular tubular structure.

A liquid feature detector, including: a liquid level sensor body and the above ultrasonic concentration detector; the liquid level sensor body includes a bottom case and an outlet tube; the ultrasonic concentration detector is horizontally fixed on the bottom case, and the ultrasonic transducer sheet of the ultrasonic concentration detector and an temperature sensor are both connected to a wire in the outlet tube.

A liquid feature detector includes a bottom case, an outlet tube, a liquid level detection tube, a concentration detection tube, a first ultrasonic transducer sheet and a temperature sensor; the outlet tube and the liquid level detection tube are both vertically arranged on the bottom case, and a wire for connecting to an external circuit board is disposed in the outlet tube; the concentration detection tube is horizontally disposed on the bottom case, a first end of the concentration detection tube is encapsulated with a reflection plate, a second end of the concentration detection tube further includes a first end cap, and the first end cap is mounted on the bottom case; the reflection plate faces to the inside surface of the first end cap; the first ultrasonic transducer sheet is attached to the outside surface of the first end cap and is located in the bottom case; a temperature sensor is disposed in the bottom case; the temperature sensor and the first ultrasonic transducer sheet are both electrically connected with the wire; an upper side of the concentration detection tube is provided with a first upper through hole, and a lower side of the concentration detection tube is provided with a first lower through hole, and the first upper through hole and the first lower through hole are communicated with an interior of the concentration detection tube; in a plane perpendicular to an extending direction of the concentration detection tube, an angle of the first upper through hole is an angle between a line connecting a first side of the first upper through hole with a center of a cross section of the concentration detection tube and a line connecting a second side of the first upper through hole with the center of the cross section of the concentration detection tube; in the plane perpendicular to the extending direction of the concentration detection tube, an angle of the first lower through hole is an angle between a line connecting a first side of the first lower through hole with the center of the cross section of the concentration detection tube and a line connecting a second side of the first lower through hole with the center of the cross section of the concentration detection tube; and the angle of the first upper through hole is larger than the angle of the first lower through hole, wherein the first side of the first upper through hole, the second side of the first upper through hole, the first side of the first lower through hole and the second side of the first lower through hole are parallel to the extending direction of the concentration detection tube, and the first upper through hole and the first lower through hole face to each other.

Optionally, the angle of the first upper through hole is in a range of 60°-120°, and the angle of the first lower through hole is in a range of 15°-40°.

Optionally, liquid feature detector further includes a second end cap disposed at a bottom end of the liquid level detection tube, wherein the second end cap is installed on the bottom case; an outside surface of a upper end of the concentration detection tube is provided with a second upper through hole, and an outside surface of a lower end of the concentration detection tube is provided with a second lower through hole, and the second upper through hole and the second lower through hole are communicated with the interior of the concentration detection tube; and a floating bucket is disposed inside the liquid level detection tube; a reflection surface is provided at a bottom end surface of the floating bucket, the reflection surface faces to an inside surface of the second end cap, a second ultrasonic transducer sheet is attached to an outside surface of the second end cap, and the second ultrasonic transducer sheet is disposed at the bottom case and electrically connected to the wire.

Optionally, two second lower through holes are provided, the two second lower through holes are disposed at the bottom end of the liquid level detection tube, the two second lower through holes are symmetrical about a center of the outlet tube, two second lower through holes are arranged as an angle of 120° with respect to a center of the liquid level detection tube, and the two second lower through holes face to the outlet tube.

The ultrasonic concentration detector and the liquid feature detector of the present disclosure can effectively reduce the entry of air bubbles and quickly discharge the air bubbles and impurities, and effectively shield influences of interference caused by external motion on the performance, thereby improving the accuracy of the measurement results. The level sensor realizes concentration detection, liquid level detection and temperature detection, has various functions, which brings convenience for use, and reduces the flow rate, improving the accuracy of the system measurement.

DESCRIPTION OF FIGURE REFERENCES 100, an ultrasonic concentration detector; 10, a body; 11, an end cap part; 12, a wire outlet; 101, a sealed chamber; 20, a concentration detection tube; 201, an upper through hole; 202, a lower through hole; 30, an ultrasonic transducer sheet; 40, a reflection plate; 50, a leading-out wire; 60, a temperature sensor; 70, a liquid level sensor body; 71, a bottom case; 72, an outlet tube;
10', a bottom case; 11', a body;
111', an upper step surface; 112', a lower step surface;
12', a bottom plate; 20', an outlet tube;
30', a liquid level detection tube; 31', a second end cap;
301', a second upper through hole; 302', a second lower through hole;
40', a concentration detection tube; 41', a first end cap;
401', a first upper through hole; 402', a first lower through hole;
50', a first ultrasonic transducer sheet; 61', a wire;
62', a reflection plate; 63', a floating bucket;
64', a second ultrasonic transducer sheet; 65', a temperature sensor;
70', a positioning assembly.

DETAILED DESCRIPTION

Figure 2:
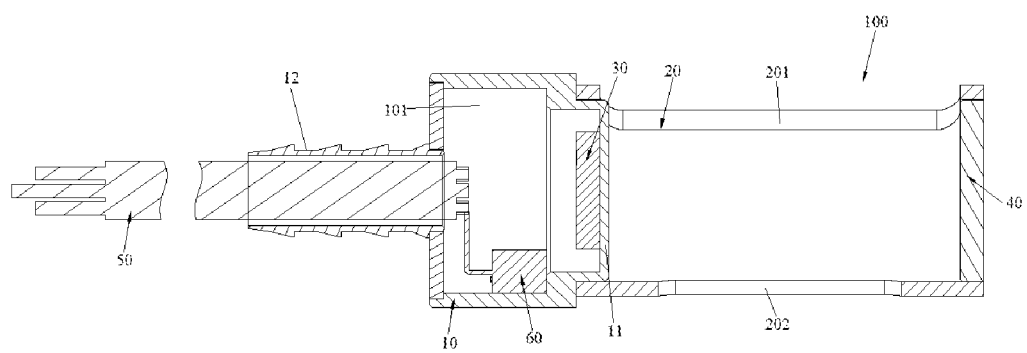
FIG. 2 is a cross-sectional view of an ultrasonic concentration detector provided by an embodiment.
Figure 3:
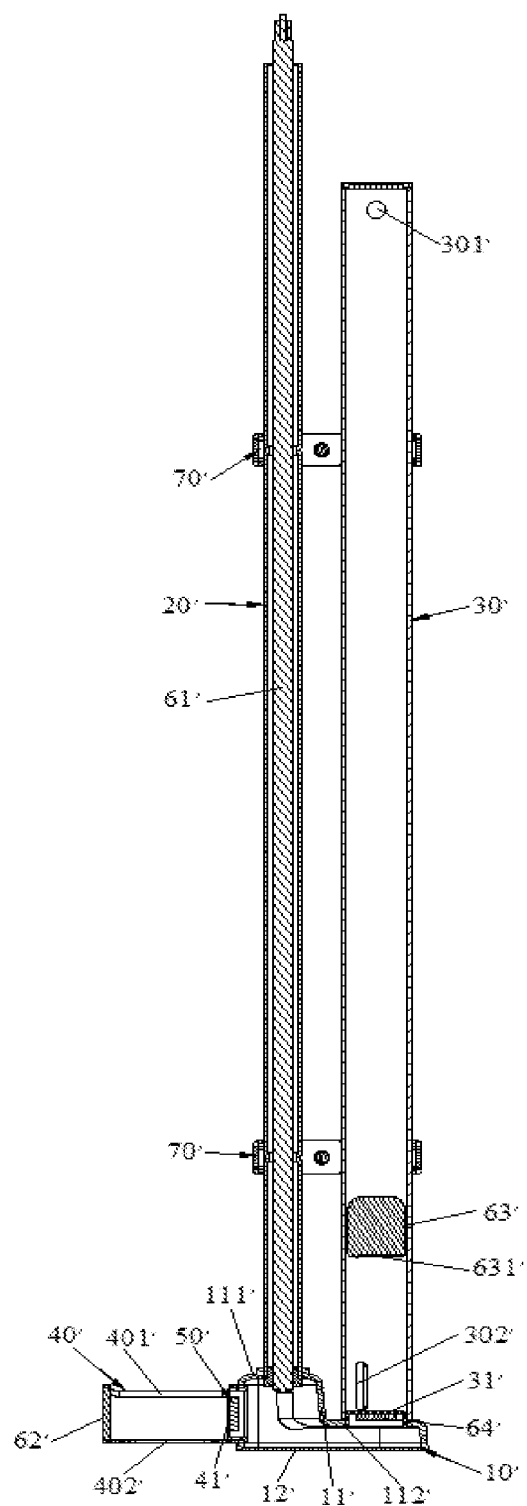
FIG. 3 is a cross-sectional view of an ultrasonic concentration detector provided by another embodiment.

Referring to FIG. 2, an ultrasonic concentration detector 100 provided in this embodiment includes a body 10, a concentration detection tube 20, an ultrasonic transducer sheet 30, and a temperature sensor 60.

The body 10 has a sealed chamber 101. The body 10 has an end cap part 11. In this embodiment, the body 10 has a hexahedron structure.

The concentration detection tube 20 is horizontally disposed, an opening at a first end of the concentration detection tube 20 is encapsulated by a reflection plate 40, the end cap part 11 encapsulates an opening at a second end of the concentration detection tube 20, and the reflection plate 40 faces to an outer surface of the end cap part 11. A upper side of the concentration detection tube 20 is provided with an upper through hole 201, a lower side of the concentration detection tube 20 is provided with a lower through hole 202, and the upper through hole 201 and the lower through hole 202 are communicated with an interior of the concentration detection tube 20. An opening angle of the upper through hole 201 with respect to an axis center of the concentration detection tube 20 is greater than an opening angle of the lower through hole 202 with respect to the axis center of the concentration detection tube 20. The upper through hole 201 and the lower through hole 202 face to each other upper and lower. The opening angle of the upper through hole 201 with respect to the axis center of the concentration detection tube 20 is an angle of the upper through hole 201. The angle of the upper through hole 201 is an angle between a line connecting a first side of the upper through hole 201 with a center of a cross section of the concentration detection tube 20 and a line connecting a second side of the upper through hole 201 with the center of the cross section of the concentration detection tube 20 in a plane perpendicular to an extending direction of the concentration detection tube 20. The opening angle of the lower through hole 202 with respect to the axis center of the concentration detection tube 20 is an angle of the lower through hole 202. The angle of the lower through hole 202 is an angle between a line connecting a first side of the lower through hole 202 with the center of the cross section of the concentration detection tube 20 and a line connecting a second side of the lower through hole 202 with the center of the cross section of the concentration detection tube 20 in the plane perpendicular to the extending direction of the concentration detection tube 20. The first side of the upper through hole 201, the second side of the upper through hole 201, the first side of the lower through hole 202 and the second side of the lower through hole 202 are parallel to the extending direction of the concentration detection tube 20.

In the present embodiment, the concentration detection tube 20 is a circular tubular structure, the angle of the upper through hole is in a range of 65°-120°, and the angle of the lower through hole in a range of 15°-40°. Optionally, the angle of the upper through hole is 75°-85°, and the angle of the lower through hole is 15°-25° so as to better slow down convection of the liquid to avoid affecting the stability of the detecting. Exemplarily, in an embodiment, the angle of the upper through hole is in a range of 60°-120°, and the angle of the lower through hole is in a range of 15°-40°. In the present embodiment and the following embodiments, the part A and the part B face to each other means that the part A and part B are oppositely arranged.

The ultrasonic transducer sheet 30 and the temperature sensor 60 are both disposed in the sealed chamber 101. The ultrasonic transducer sheet 30 and the reflection plate 40 are respectively installed at two ends of the concentration detection tube 20 and face to each other. In this embodiment, the ultrasonic transducer sheet 30 is attached to the inner surface of the end cap part 11. In the present embodiment, the temperature sensor 60 is attached to the inner wall of the body 10. A wire outlet 12 is extended from the body 10, the wire outlet 12 communicates with the sealed chamber 101, and a leading-out wire 50 is provided in the wire outlet 12, the leading-out wire 50 connects the ultrasonic transducer sheet 30 and the temperature sensor 60. As shown in FIG. 2, the wire outlet 12 and the concentration detection tube 20 are coaxially arranged, and an axial direction of the outlet 12 and an axial direction of the concentration detection tube 20 may also be perpendicular to each other.

In use, the ultrasonic transducer sheet 30 and the temperature sensor 60 are connected to an external circuit through the leading-out wire 50. The body 10 and the concentration detection tube 20 are all sunk into the urea solution. The urea solution enters the concentration detection tube 20 through the upper through hole 201 and The lower through hole 202.

When the concentration detection of the urea solution is required, the ultrasonic transducer sheet 30 sends a signal into the concentration detection tube 20, the signal is reflected by the reflection plate 40, and the reflected signal is received by the ultrasonic transducer sheet plate 30 and is sent to the external circuit board through the PCB board 60 for analysis and processing to obtain the concentration of the urea solution. And, a temperature of the urea solution is transferred to the body 10, and the temperature sensor 70 senses the temperature of the body 10 so as to obtain the temperature of the urea solution.

Figure 1:
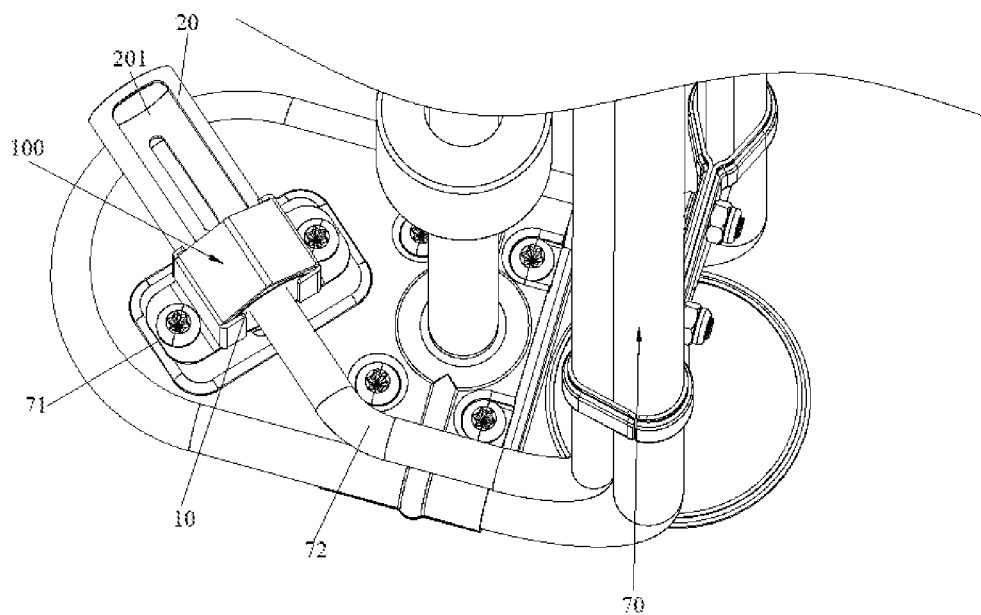
FIG. 1 is a partial perspective view of a liquid level sensor provided by an embodiment.

As shown in FIG. 1, a liquid level sensor applying the aforementioned ultrasonic concentration detector 100 provided in this embodiment includes: a liquid level sensor body 70. The liquid level sensor body 70 is configured to detect the liquid level height of the liquid. The shape of the liquid level sensor body 70 is not limited. The liquid level sensor body 70 has a bottom case 71 and an outlet tube 72. The ultrasonic concentration detector 100 is horizontally fixed on the bottom case 71, and the ultrasonic transducer sheet 30 of the ultrasonic concentration detector 100 is electrically connected with the wire in the outlet tube 72. By integrating the ultrasonic concentration detector 100 in the liquid level sensor, the liquid level sensor has functions of liquid level detection, temperature detection and concentration detection, which brings more convenience to usage.

Figure 4:
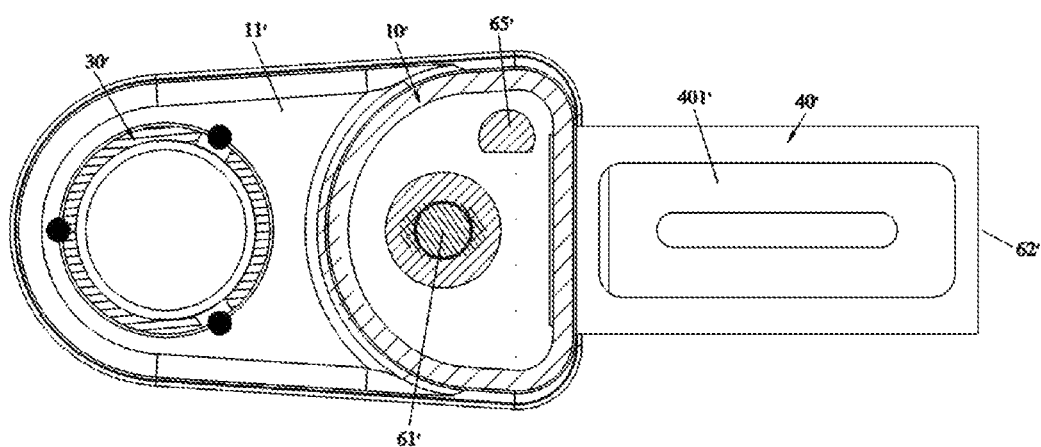
FIG. 4 is a cross-sectional view of an ultrasonic concentration detector provided by another embodiment.

Referencing to 3 and FIG. 4, a liquid feature detector provided in this embodiment includes: a bottom case 10', an outlet tube 20', a liquid level detection tube 30', a concentration detection tube 40', and a first ultrasonic transducer sheet 50'.

The outlet tuber 20' and the liquid level detection tuber 30' are both vertically disposed on the bottom case 10', and a wire 61' to connect to an external circuit board is disposed in the outlet tuber 20'. In this embodiment, the bottom case 10' includes a body 11' and a bottom plate 12'. A top part of the body 11' has an upper step surface 111' and a lower step surface 112'. A lower end of the outlet tuber 20' is mounted on the upper step surface 111'. A lower end of the liquid level detection tube 30' is mounted on the lower step surface 112', the bottom plate 12' seals a bottom opening of the body 11'.

The concentration detection tube 40' is horizontally disposed on the bottom case 10', a first end of the concentration detection tube 40' is encapsulated with a reflection plate 62'. A second end of the concentration detection tube 40' further includes a first end cap 41', which is mounted on the bottom case 10'. The reflection plate 62' faces to the inside surface of the first end cap 41'. The first ultrasonic transducer sheet 50' is attached to the outside surface of the first end cap 41', is located in the bottom case 10' and is electrically connected with the wire 61'. An upper side of the concentration detection tube 40' is provided with a first upper through hole 401', and a lower side of the concentration detection tube 40' is provided with a first lower through hole 402', and the first upper through hole 401' and the first lower through hole 402' are communicated with an interior of the concentration detection tube 40'. An opening angle of the first upper through hole 401' with respect to an axis center of the first concentration detection tube 40' is greater than an opening angle of the first lower through hole 402' with respect to the axis center of the first concentration detection tube 40'. The first upper through hole 401' and the first lower through hole 402' face to each other upper and lower. The opening angle of the first upper through hole 401' with respect to the axis center of the first concentration detection tube 40' is an angle of the first upper through hole 401'. The angle of the first upper through hole 401' is an angle between a line connecting a first side of the upper through hole with a center of a cross section of the concentration detection tube and a line connecting a second side of the upper through hole with the center of the cross section of the concentration detection tube in the plane perpendicular to the extending direction of the concentration detection tube. The opening angle of the first lower through hole 402' with respect to the axis center of the first concentration detection tube 40' is an angle of the first lower through hole 402'. The angle of the first lower through hole 402' is an angle between a line connecting a first side of the first lower through hole 402' with the center of the cross section of the first concentration detection tube 40' and a line connecting a second side of the first lower through hole 402' with the center of the cross section of the first concentration detection tube 40' in the plane perpendicular to the extending direction of the concentration detection tube. The first side of the first upper through hole 401', the second side of the first upper through hole 401', the first side of the first lower through hole 402' and the second side of the first lower through hole 402' are parallel to an extending direction of the first concentration detection tube 40'.

In this embodiment, the concentration detection tube 40' is installed on the side of the body 11', and the concentration detection tube 40' is a circular tubular structure. The angle of the first upper through hole is in a range of 65°-120°, and the angle of the first lower through hole in a range of 15°-40°. Optionally, the angle of the first upper through hole is 75°-85°, and the angle of the first lower through hole is 15°-25° so as to better slow down convection of the liquid to avoid affecting the stability of the detecting.

In addition, a bottom end of the liquid level detection tube 30' has a second end cap 31', and the second end cap 31' is mounted on the bottom case 10'. An outside surface of a upper end of the liquid level detection tube 30' is provided with a second upper through hole 301', and an outside surface of a lower end of the liquid level detection tube 30' is provided with a second lower through hole 302', and the second upper through hole 301' and the second lower through hole 302' are communicated with an interior of the liquid level detection tube 30'. Besides, a floating bucket 63' is disposed inside the liquid level detection tube 30'. A reflection surface is provided at the bottom end surface of the floating bucket 63', and the reflection surface faces to an inner side surface of the second end cap 31'. A second ultrasonic transducer sheet 64' is attached to an outer side surface of the second end cap 31', and the second ultrasonic transducer sheet 64' is disposed at the bottom case 10' and electrically connected to the wire 61'. In this embodiment, the width of the second lower through-hole 302' is 3 mm, the height is 15 mm, and the number of second lower through-holes 302' is two, and the two second lower through-holes 302' are located at the bottom end of the liquid level detection tube 40', symmetrical with respect to a center of the outlet tuber 20', and arranged as an angle of 120° with respect to a center of the liquid level detection tube 30', and the two second lower through holes 302' face to the outlet tube to better slow down convection of the liquid to avoid affecting the stability of the detecting.

Optionally, a temperature sensor 65' is disposed in the bottom case 10', electrically connected to the wire 61' and configured to detect temperature of the liquid.

Optionally, positioning assemblies 70' are disposed between the upper end and the lower end of the outlet tube 20' and between the upper end and the lower end of the liquid level detection tube 30', so that the overall structure of the product is stable.

Optionally, the bottom case 10', the outlet tuber 20', the liquid level detection tuber 30' and the concentration detection tuber 40' are all sunk into the urea solution, and the urea solution enters the liquid level detection tube 30' through the second lower through hole 302', making the floating tank 63' float, and meanwhile the urea solution also enters the concentration detection tube 40' through the first upper through hole 401' and the first lower through hole 402'.

When it is required to perform concentration detection on the urea solution, the first ultrasonic transducer sheet 50' sends a signal to the concentration detection tube 40', the signal is reflected by the reflection plate 62', and the reflected signal is received by the first ultrasonic transducer sheet 50' and is sent to the external circuit board through the wire 61' for analysis and processing to obtain the concentration of the urea solution.

When it is required to perform liquid level detection on the urea solution, the second ultrasonic transducer sheet 64' sends a signal to the liquid level detection tube 30', the signal is reflected based on the affection of reflection surface 631' of the floating bucket 63', and the reflected signal is received by the second ultrasonic transducer sheet 64' and is sent to the external circuit board through the wire 61' for analysis and processing to obtain the liquid level of the urea solution.

Moreover, the temperature of the urea solution is transferred to the bottom case 10', and the temperature sensor 65' senses the temperature on the bottom case 10' so as to obtain the temperature of the urea solution.

In the liquid level sensor applying the aforementioned ultrasonic concentration detector in the present embodiment, first, the reflection plate and the ultrasonic transducer sheet are respectively disposed at both ends of the concentration detection tube, and the upper through hole and lower through hole which are communicated with the interior of the concentration detection tube are disposed at the upper side and lower side of the concentration detection tube respectively to form convection, thereby effectively reducing the entry of air bubbles, quickly discharging the air bubbles and impurities, effectively shield the influences of interference caused by external motion on the performance, and thus improving accuracy of the measurement results. Secondly, by integrating the ultrasonic concentration detector on the liquid level sensor, the liquid level sensor becomes an integration of concentration detection, liquid level detection, and temperature detection, which has versatile functions and is convenient for use. Furthermore, by providing the second ultrasonic transducer sheet and the temperature sensor and combining the second ultrasonic transducer sheet and the reflection surface at the bottom of the floating bucket, ultrasonic liquid level detection can be performed on the liquid. The first upper through hole and the first lower through hole are symmetrical with respect to a center of the bottom case and a center of the outlet tuber, and the first upper through hole and the first lower through hole are arranged as an angle of 120° with respect to the center of the liquid level detection tube to avoid forming a convection field in an opening direction, and at a side of the first upper through hole and the first lower through hole facing to the outlet tuber, the flow rate is reduced due to the help of the outlet tuber, thereby improving the accuracy of the system measurement.

What it is claimed is:

1. An ultrasonic concentration detector, comprising: a body, a concentration detection tube, and an ultrasonic transducer sheet; wherein, the body comprises a sealed chamber;

the concentration detection tube is horizontally disposed, an opening at a first end of the concentration detection tube is encapsulated by a reflection plate, an opening at a second end of the concentration detection tube is encapsulated by the body, an upper side of the concentration detection tube is provided with an upper through-hole, a lower side of the concentration detection tube is provided with a lower through-hole, and the upper through-hole and the lower through-hole are communicated with an interior of the concentration detection tube;

in a plane perpendicular to an extending direction of the concentration detection tube, an angle of the upper through-hole is an angle between a line connecting a first side of the upper through-hole with a center of a cross section of the concentration detection tube and a line connecting a second side of the upper through-hole with the center of the cross section of the concentration detection tube;

in the plane perpendicular to the extending direction of the concentration detection tube, an angle of the lower through-hole is an angle between a line connecting a first side of the lower through-hole with the center of the cross section of the concentration detection tube and a line connecting a second side of the lower through hole with the center of the cross section of the concentration detection tube;

the angle of the upper through-hole is larger than the angle of the lower through-hole, wherein the first side of the upper through-hole, the second side of the upper through-hole, the first side of the lower through-hole and the second side of the lower through-hole are parallel to the extending direction of the concentration detection tube, and the upper through-hole and the lower through-hole face to each other; and the ultrasonic transducer sheet is disposed in the sealed chamber at the second end of the concentration detection tube facing to the reflection plate.

2. The ultrasonic concentration detector according to claim 1, further comprising a temperature sensor disposed in the sealed chamber.

3. The ultrasonic concentration detector according to claim 2, wherein the temperature sensor is attached on an inner wall of the body, the body further comprises a wire outlet, and the wire outlet is communicated with the sealed chamber.

4. The ultrasonic concentration detector according to claim 1, wherein the body further comprises an end cap part,
the end cap part is configured to encapsulate the opening at the second end of the concentration detection tube;
the reflection plate faces to an outer surface of the end cap part; and
the ultrasonic transducer sheet is attached on an inner surface of the end cap part.

5. The ultrasonic concentration detector according to claim 1, wherein the angle of the upper through-hole is in a range of 60°-120°, and the angle of the lower through-hole is in a range of 15°-40°.

6. The ultrasonic concentration detector according to claim 1, wherein the concentration detection tube is a circular tubular structure.

7. A liquid feature detector, comprising: a liquid level sensor body and an ultrasonic concentration detector;
wherein the ultrasonic concentration detector, comprises:
a body, a concentration detection tube, an ultrasonic transducer sheet and a temperature sensor; wherein,
the body comprises a sealed chamber;
the concentration detection tube is horizontally disposed, an opening at a first end of the concentration detection tube is encapsulated by a reflection plate, an opening at a second end of the concentration detection tube is encapsulated by the body, a upper side of the concentration detection tube is provided with an upper through-hole, a lower side of the concentration detection tube is provided with a lower through-hole, and the upper through-hole and the lower through-hole are communicated with an interior of the concentration detection tube;
in a plane perpendicular to an extending direction of the concentration detection tube, an angle of the upper through-hole is an angle between a line connecting a first side of the upper through-hole with a center of a cross section of the concentration detection tube and a line connecting a second side of the upper through-hole with the center of the cross section of the concentration detection tube;
in the plane perpendicular to the extending direction of the concentration detection tube, an angle of the lower through-hole is an angle between a line connecting a first side of the lower through-hole with the center of the cross section of the concentration detection tube and a line connecting a second side of the lower through-hole with the center of the cross section of the concentration detection tube;

the angle of the upper through-hole is larger than the angle of the lower through-hole, wherein the first side of the upper through-hole, the second side of the upper through-hole, the first side of the lower through-hole and the second side of the lower through-hole are parallel to the extending direction of the concentration detection tube, and the upper through-hole and the lower through-hole face to each other; and the ultrasonic transducer sheet is disposed in the sealed chamber at the second end of the concentration detection tube facing to the reflection plate; and wherein the liquid level sensor body comprises a bottom case and an outlet tube;
wherein the ultrasonic concentration detector is horizontally fixed on the bottom case, and the ultrasonic transducer sheet and the temperature sensor of the ultrasonic concentration detector are both connected to a wire in the outlet tube.

8. The liquid feature detector according to claim 7, wherein the temperature sensor is disposed in the sealed chamber.

9. The liquid feature detector according to claim 8, wherein the temperature sensor is attached on an inner wall of the body, the body further comprises a wire outlet, and the wire outlet is communicated with the sealed chamber.

10. The liquid feature detector according to claim 7, wherein the body further comprises an end cap part,
the end cap part is configured to encapsulate an opening at a second end of the concentration detection tube;
the reflection plate faces to an outer surface of the end cap part; and
the ultrasonic transducer sheet is attached on an inner surface of the end cap part.

11. The liquid feature detector according to claim 7, wherein the angle of the upper through-hole is in a range of 60°-120°, and the angle of the lower through-hole is in a range of 15°-40°.

12. The liquid feature detector according to claim 7, wherein the concentration detection tube has a circular tubular structure.

13. A liquid feature detector, comprising: a bottom case, an outlet tube, a liquid level detection tube, a concentration detection tube, a first ultrasonic transducer sheet and a temperature sensor; wherein,
the outlet tube and the liquid level detection tube are both vertically arranged on the bottom case, and a wire for connecting to an external circuit board is disposed in the outlet tube;
the concentration detection tube is horizontally disposed on the bottom case, a first end of the concentration detection tube is encapsulated with a reflection plate, a second end of the concentration detection tube further comprises a first end cap, and the first end cap is mounted on the bottom case;
the reflection plate faces to an inside surface of the first end cap; the first ultrasonic transducer sheet is attached to an outside surface of the first end cap and is located in the bottom case; the temperature sensor is disposed in the bottom case; the temperature sensor and the first ultrasonic transducer sheet are both electrically connected with the wire;
an upper side of the concentration detection tube is provided with a first upper through-hole, and a lower side of the concentration detection tube is provided with a first lower through-hole, and the first upper through-hole and the first lower through-hole are communicated with an interior of the concentration detection tube;

in a plane perpendicular to an extending direction of the concentration detection tube, an angle of the first upper through-hole is an angle between a line connecting a first side of the first upper through-hole with a center of a cross section of the concentration detection tube and a line connecting a second side of the first upper through-hole with the center of the cross section of the concentration detection tube;

in the plane perpendicular to the extending direction of the concentration detection tube, an angle of the first lower through-hole is an angle between a line connecting a first side of the first lower through-hole with the center of the cross section of the concentration detection tube and a line connecting a second side of the first lower through-hole with the center of the cross section of the concentration detection tube; and the angle of the first upper through-hole is larger than the angle of the first lower through-hole, wherein the first side of the first upper through-hole, the second side of the first upper through-hole, the first side of the first lower through-hole and the second side of the first lower through-hole are parallel to the extending direction of the concentration detection tube, and the first upper through-hole and the first lower through-hole face to each other.

14. The liquid feature detector according to claim 13, wherein the angle of the first upper through-hole is in a range of 60°-120°, and the angle of the first lower through-hole is in a range of 15°-40°.

15. The liquid feature detector according to claim 13, further comprising a second end cap disposed at a bottom end of the liquid level detection tube, wherein the second end cap is installed on the bottom case;

an outside surface of a upper end of the concentration detection tube is provided with a second upper through-hole, and an outside surface of a lower end of the concentration detection tube is provided with a second lower through-hole, and the second upper through-hole and the second lower through-hole are communicated with the interior of the concentration detection tube; and a floating bucket is disposed inside the liquid level detecting tube; a reflection surface is provided at a bottom end surface of the floating bucket, the reflection surface faces to an inside surface of the second end cap, a second ultrasonic transducer sheet is attached to an outside surface of the second end cap, and the second ultrasonic transducer sheet is disposed at the bottom case and electrically connected to the wire.

16. The liquid feature detector according to claim 15, wherein two second lower through-holes are provided, the two second lower through-holes are disposed at the bottom end of the liquid level detecting tube, the two second lower through-holes are symmetrical with respect to a center of the outlet tube, the two second lower through-holes are arranged as an angle of 120° with respect to a center of the liquid level detecting tube, and the two second lower through-holes face to the outlet tube.

* * * * *